US007614841B2

(12) United States Patent
Friedrich et al.

(10) Patent No.: US 7,614,841 B2
(45) Date of Patent: Nov. 10, 2009

(54) LIFTING FORK

(75) Inventors: Thomas Friedrich, Waakirchen (DE); Bernie Faloney, Baltimore, MD (US); Gordon Besch, New Brighton, MI (US)

(73) Assignee: Kinshofer GmbH, Waakirchen (DE)

( * ) Notice: Subject to any disclaimer, the term of this patent is extended or adjusted under 35 U.S.C. 154(b) by 0 days.

(21) Appl. No.: 10/860,708

(22) Filed: Jun. 3, 2004

(65) Prior Publication Data

US 2005/0226710 A1 Oct. 13, 2005

(30) Foreign Application Priority Data

Jun. 3, 2003 (DE) ........................... 203 08 664 U

(51) Int. Cl.
*B65G 65/23* (2006.01)

(52) U.S. Cl. ...................................... 414/672; 187/237

(58) Field of Classification Search ................. 414/607, 414/688, 639–641, 662–670, 685, 785, 705, 414/711–712, 620, 672, 634–638, 673; 294/67.21, 294/67.5, 81.3; 187/237
See application file for complete search history.

(56) References Cited

U.S. PATENT DOCUMENTS

| | | | | | |
|---|---|---|---|---|---|
| 1,649,364 | A | * | 11/1927 | Peterson | 294/81.3 |
| 2,411,263 | A | * | 11/1946 | Guerin et al. | 414/641 |
| 2,456,320 | A | * | 12/1948 | Repke | 414/635 |
| 2,495,658 | A | * | 1/1950 | Moseley | 294/67.21 |
| 2,690,926 | A | * | 10/1954 | Betz | 294/67.21 |
| 2,772,794 | A | * | 12/1956 | Cramer et al. | 414/543 |
| 2,979,217 | A | * | 4/1961 | Tomasovich | 414/641 |
| 3,039,631 | A | * | 6/1962 | Baker | 414/420 |
| 3,301,587 | A | * | 1/1967 | Heikkinen | 294/67.21 |
| RE26,442 | E | * | 8/1968 | Dunbar | 294/67.21 |
| 3,544,149 | A | * | 12/1970 | Saarinen | 294/81.4 |
| 4,095,714 | A | * | 6/1978 | Schuster | 414/607 |
| 4,143,782 | A | * | 3/1979 | Dengler | 414/672 |
| 4,431,223 | A | * | 2/1984 | Miller | 294/81.4 |
| 4,626,012 | A | * | 12/1986 | Weldele | 294/81.3 |
| 4,708,577 | A | * | 11/1987 | Fratzke | 414/635 |
| 4,921,389 | A | * | 5/1990 | O'Daniel | 414/420 |
| 4,936,616 | A | * | 6/1990 | Williams | 294/81.3 |
| 4,973,094 | A | * | 11/1990 | Tana et al. | 294/81.21 |
| 5,391,043 | A | * | 2/1995 | Bohata et al. | 414/544 |
| 5,671,960 | A | * | 9/1997 | Chyz | 294/81.3 |

(Continued)

FOREIGN PATENT DOCUMENTS

| | | |
|---|---|---|
| DE | 196 51 368 | 6/1998 |

(Continued)

*Primary Examiner*—Charles A Fox
(74) *Attorney, Agent, or Firm*—Dilworth & Barrese, LLP

(57) ABSTRACT

The invention relates to a lifting fork for lifting pallets, panels, panel stacks, and the like, and comprises a fork carrier, the lower end of which supports lifting prongs, and the upper end of which is attachable to a linking piece which has a pendulous axis for the pendulous mounting of the lifting fork. According to the invention, the lifting fork is distinguished by the fact that a swivel device is provided by which all the lifting prongs are able to be swiveled, in the unloaded state, about a common axis which is located parallel to the pendulous axis of the linking piece and parallel to the insertion direction in which the lifting prongs are insertable under a pallet, panels, or a panel stack, or the like.

19 Claims, 4 Drawing Sheets

U.S. PATENT DOCUMENTS

| | | | | |
|---|---|---|---|---|
| 5,803,520 | A * | 9/1998 | Bagrowski, III | 294/67.33 |
| 6,068,086 | A * | 5/2000 | Bushong et al. | 187/237 |
| 6,360,459 | B1 * | 3/2002 | Brookhart et al. | 37/442 |
| 6,616,400 | B1 * | 9/2003 | Caponey | 414/809 |

FOREIGN PATENT DOCUMENTS

| | | |
|---|---|---|
| DE | 201 17 513 | 3/2002 |

* cited by examiner

LIFTING FORK

BACKGROUND OF THE INVENTION

The invention relates to a lifting fork for lifting pallets, panels, panel stacks, and the like, and comprises a fork carrier, the lower end of which supports lifting prongs, and the upper end of which is attachable to a linking piece which has a pendulous axis for the pendulous mounting of the lifting fork on a crane jib, lifting cable, or the like.

An example of a lifting fork of this type was disclosed in DE 201 17 513 U1. The lifting fork shown therein is in the form of a turning fork, i.e., the lifting prongs are attached to a prong carrier which is swivelable by means of a slewing motor about an axis perpendicular to the longitudinal axis of the lifting prongs. As a result, already lifted panels can be swung around on edge, thereby facilitating handling when being carried.

A problem is encountered with such lifting forks whenever the pallets, panel stack, or the like, are not standing flat before loading, but instead have a slight tilt, for example, when a truck is located on an incline—as is often the case for construction sites with houses being built on a slope. Due to the pendulous mounting of the lifting fork, the fork swings outward when unloaded in such a way that the lifting prongs define an essentially horizontal plane. It is in fact true that the orientation of the lifting prongs could be changed by actuating the slewing motor about the axis running perpendicular to the longitudinal axis of the lifting prongs. However, this action is of no help if the pallets or panels to be grasped from below must be grasped from below on the inclined side.

SUMMARY OF THE INVENTION

The goal of the invention is create an improved lifting fork of the species referenced above which avoids the disadvantages of prior art, and which modifies and advances this prior-art technology in an advantageous manner such that the lifting fork is able to lift from below even tilted pallets.

This goal is achieved according to the invention by a lifting fork as described herein. Preferred embodiments of the invention are also described herein.

According to the invention, the lifting prongs are able in the unloaded state, i.e., before insertion under the pallets, plates or the like, to be swiveled about an axis running parallel to the direction of insertion in which the lifting prongs are inserted under the pallets, plates or the like. If the lifting prongs have an essentially horizontal orientation when in the unloaded state before lifting a pallet, the lifting prongs may be swiveled about a common axis parallel to the longitudinal axis of the lifting prongs in such a way that the support surface defined by the lifting prongs is also no longer horizontal but has a tilted orientation that corresponds to the tilt of the pallets, panels, or the like. As a result, pallets or panels may be grasped and lifted from below from trucks parked on a slope in a fundamentally easier manner.

One possible approach might be to provide a drive assembly having an additional swivel drive directly between the lifting prong carrier and the fork carrier, in order to obtain the tilt position of the support plane defined by the lifting prongs. The specific approach taken by a further modification of the invention is to provide a drive assembly having a deflection device as a swivel device between the fork carrier and the linking piece, which deflection device has a travel axis essentially perpendicular to the pendulous axis and parallel to the support plane of the lifting fork defined by the lifting prongs, and also has a traversing drive to move the fork carrier relative to the linking piece along the travel axis. The fork carrier is thus able to be moved transversely relative to its longitudinal axis and transversely relative to the longitudinal direction of the lifting prongs, either to the right or left relative to the linking piece. This would normally displace the center of the gravity of the lifting fork. Since the lifting fork is mounted pendulously, however, the center of gravity remains in the vertical, or in a vertical plane, due to the pendulous axis, while the fork carrier rotates along with the attached lifting prongs, specifically, about the desired axis parallel to the insertion direction of the lifting prongs under the panel stack, which axis is oriented both vertically relative to the travel axis and parallel to the pendulous axis. The swivel motion of the support plane defined by the lifting prongs is thus effected by the lateral travel of the fork carrier and the gravity which holds the lifting fork along with its center of gravity under the pendulous axis.

The travel axis is preferably created by a sliding guide which is composed of two telescoping guide pieces, the first of which is preferably rigidly attached to the fork carrier, and the second of which is preferably also attached rigidly to the linking piece. The sliding guide pieces may be two telescoping beams which, seen in cross-section, may have a roughly U-shaped cross-section with projecting ridges. It is clearly understood, however, that other cross-sectional geometries are also possible.

By using two U-shaped telescoping beams, however, it is possible to create a rigid and light system, wherein simultaneously an externally covered interior space may be created which can be utilized to locate additional components of the deflection device.

Specifically, the traversing drive may be integrated into the sliding guide. Locating the traversing drive in the space between the telescoping sliding guide pieces protects the traversing drive from external influences. This approach also provides an overall compact arrangement.

The traversing drive may be of an hydraulically operating design, whereby preferably a piston cylinder unit is provided parallel to the travel axis. The piston cylinder unit here may have a cylinder which is attached to one of the two sliding guide pieces, as well as a piston which is attached to the second sliding guide piece. The piston cylinder unit is accommodated here in the space between the preferably oppositely disposed U-shaped beams.

The design of the drive assembly in the form of the described deflection device, which displaces the fork carrier traversely to the carrier's longitudinal axis relative to the linking piece, is particularly advantageous if the lifting fork is designed as a turning fork, and the drive assembly is provided for the lifting prongs to swivel the prongs relative to the fork carrier about a swivel axis running traversely to the longitudinal axis of the lifting prongs, so that grasped panels or panel stacks may be turned, i.e., positioned on edge. The lifting prongs here may be attached to a lifting prong carrier which is able to be swivelled by the drive assembly relative to the fork carrier. It is in fact quite difficult in the case of turning forks to accommodate within a compact design an additional swivel device to swivel the lifting prongs about an additional axis. The described deflection device with its travel axis between the fork carrier and the linking piece is an especially advantageous solution.

BRIEF DESCRIPTION OF THE DRAWINGS

The following discussion explains the invention in more detail based on an embodiment and associated drawings. The drawings are as follows.

DESCRIPTION OF THE PREFERRED EMBODIMENTS

Figure 1:
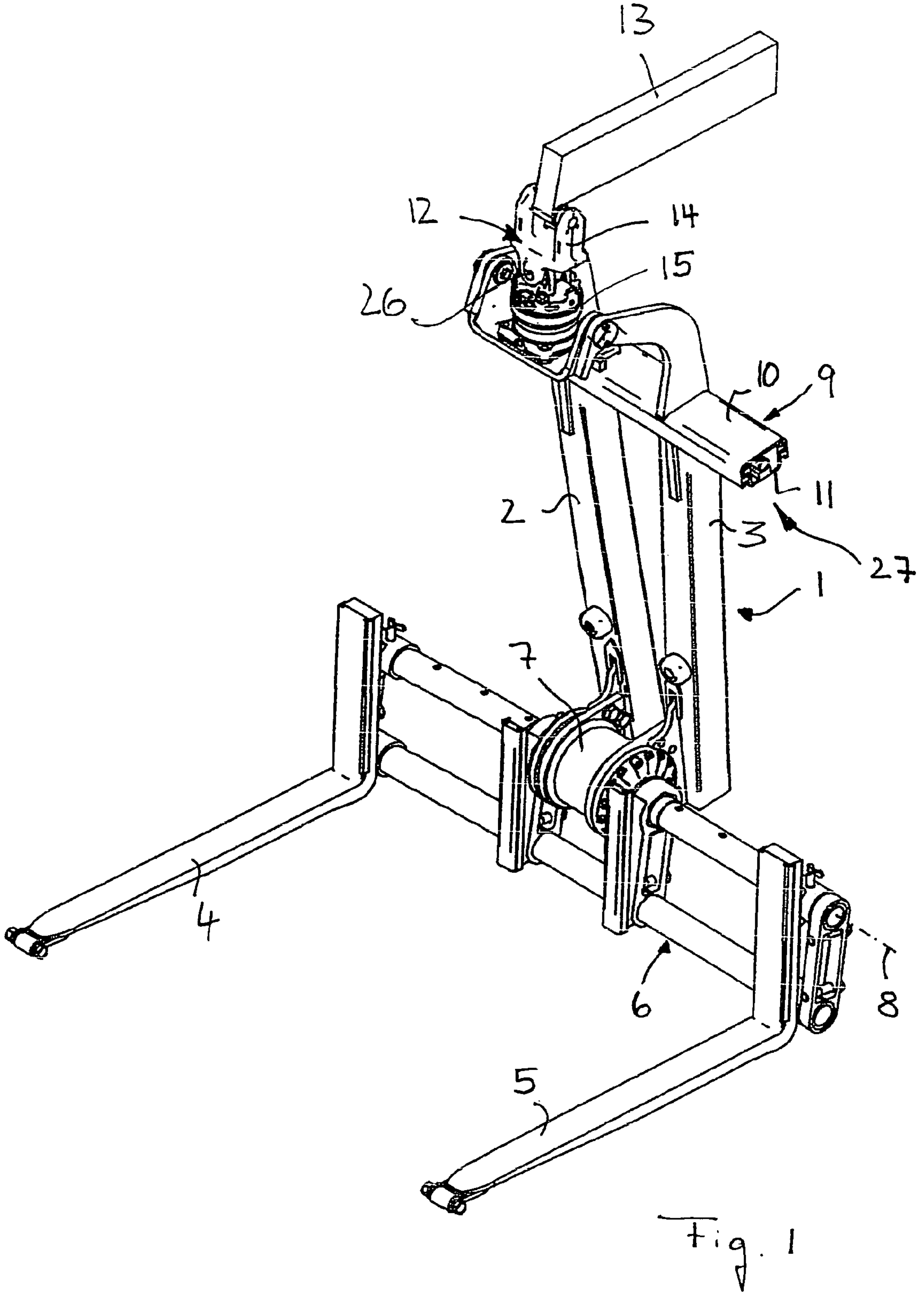
FIG. 1 is a perspective view of a turning fork in a preferred embodiment of the invention.

The lifting fork in the form of a turning fork comprises an extended, vertically oriented fork carrier 1 which is composed in the illustrated embodiment of two light beams 2 and 3 oriented in a V-shape. The lower end of fork carrier 1 supports lifting prongs 4 and 5. Lifting prongs 4 and 5 are attached to a lifting prong carrier 6 which in the illustrated embodiment is composed of two parallel tubes on which lifting prongs 4 and 5 are each movably guided such that they may be disposed with variable spacing relative to each other. Lifting prongs 4 and 5 are aligned parallel to each other. As FIG. 1 illustrates, they are composed of sectional steel beams which are bent at right angles on lifting prong carrier 6 and are attached to the two tubes of lifting prong carrier 6 at this bent segment.

Lifting prong carrier 6 is attached by a swivel drive 7 to lifting fork 1, by which swivel drive lifting prong carrier 6, and thus lifting prongs 4 and 5, are able to be pivoted about swivel axis 8 which is oriented transversely relative to both the longitudinal direction of lifting prongs 4 and 5 and the longitudinal direction of fork carrier 1. In the position illustrated in FIG. 1, lifting prongs 4 and 5 are ready to be inserted under a pallet, panels, or panel stack. Once they have grasped a panel stack from below, for example, they can be swiveled upward approximately 90° about swivel axis 8, so that the grasped panel stack comes to rest against the bent segments of lifting prongs 4 and 5, and is oriented vertically. In this position, the grasped panel stack rests between lifting prongs 4 and 5 and beams 2 and 3 of fork carrier 1, where it is essentially secured by clamping.

The upper end of fork carrier 1 is rigidly attached to a drive assembly 27 including a sliding guide 9. Sliding guide defines the travel axis 28, which extends parallel to swivel axis 8.

Figure 3:
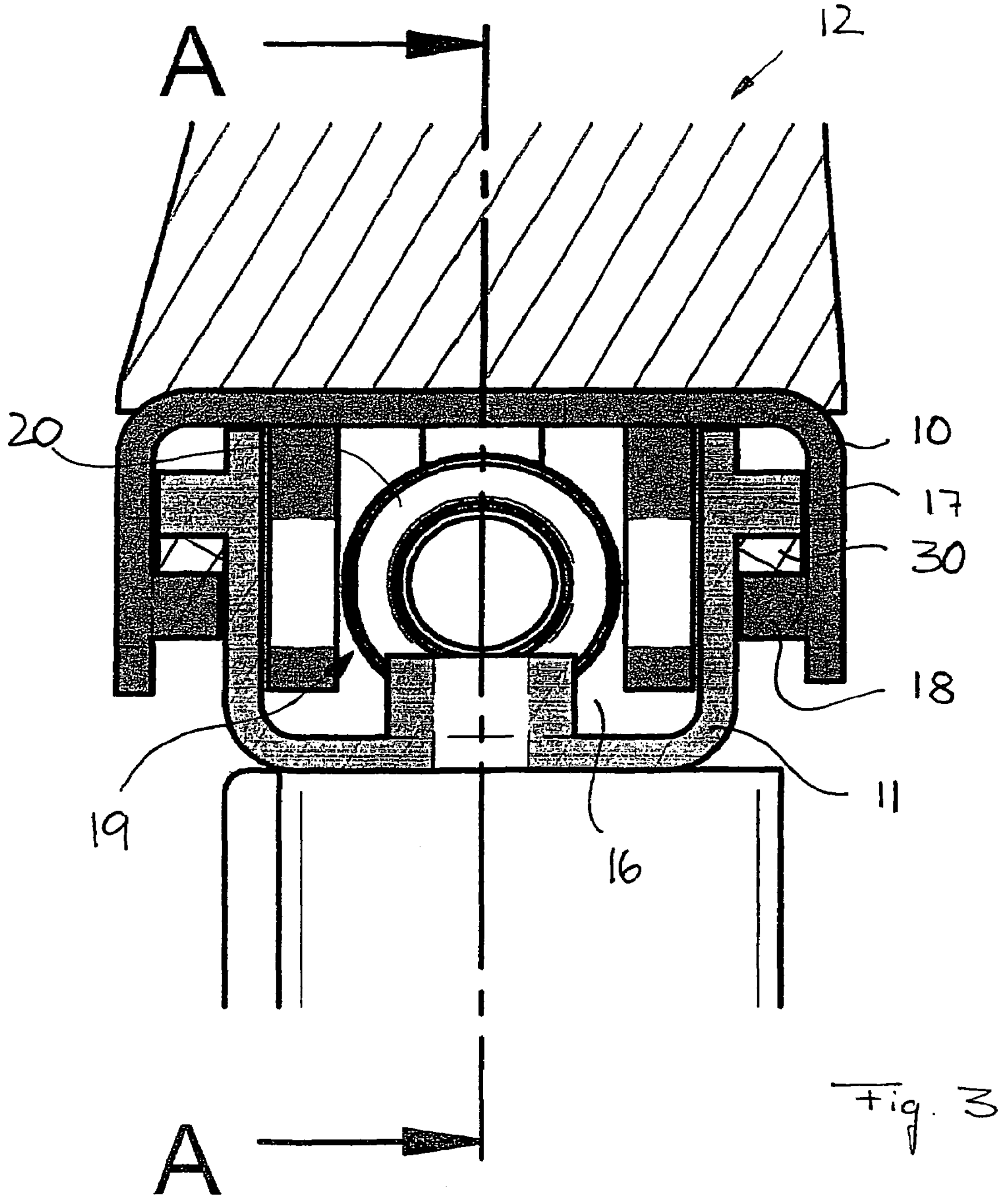
FIG. 3 shows a cross-section through a sliding guide of the drive assembly for the fork carrier.
Figure 4:
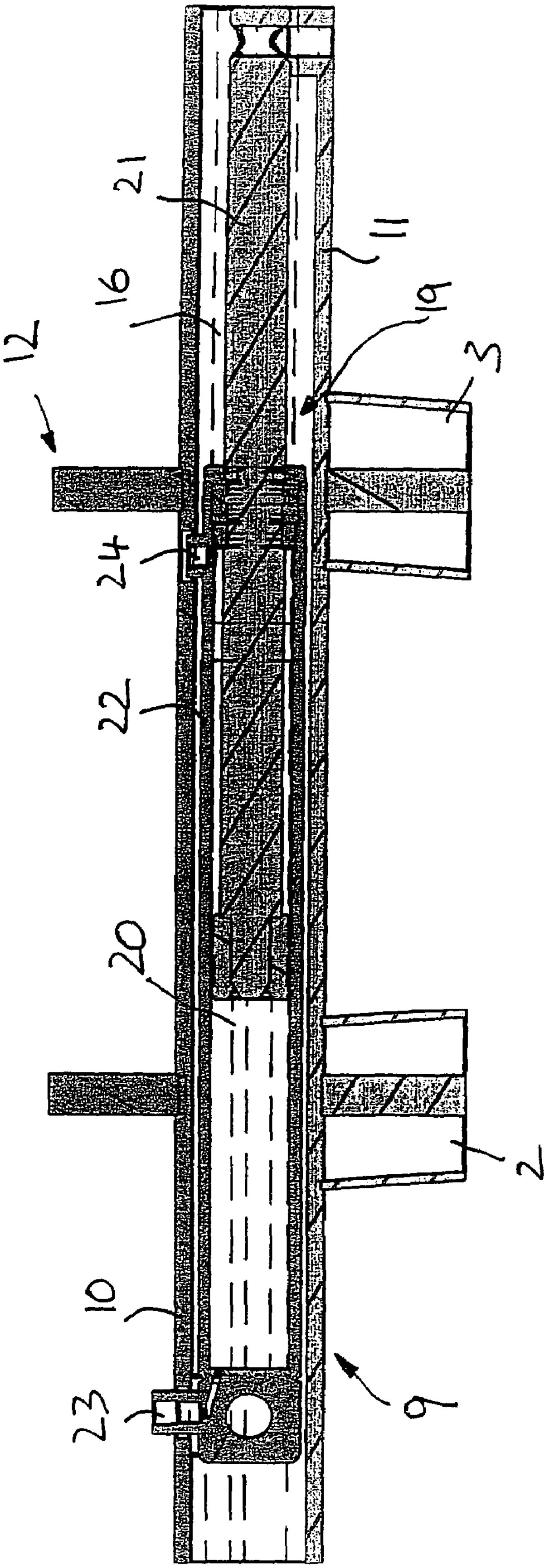
FIG. 4 shows a cross-section through the sliding guide along the line A-A in FIG. 3.

As FIGS. 3 and 4 show, sliding guide 9 is composed of two sliding guide pieces 10 and 11 which are axially movable relative to each other, these pieces each being composed of—roughly speaking—a cross-sectionally U-shaped beam. Lower beam 11 is attached to fork carrier 1. Upper beam 10 is rigidly attached to linking piece 12, by means of which the entire lifting fork can be pendulously mounted on a lifting equipment jib 13. In the embodiment illustrated, two pendulous axes are provided which are formed by a universal joint 14. Between the universal joint and linking piece 12, it is additionally possible to provide a turnable drive unit 15 to rotate the lifting fork about a vertical axis.

As FIGS. 3 and 4 show, beams 10 and 11 are aligned opposing each other so that the space between them 16 is limited. Beams 10 and 11 here are of different widths so that in the embodiment illustrated lower beam 11 along with its legs is able to move within the parallel legs of upper beam 10. Molded on to the parallel legs of beams 10 and 11 are both externally projecting guide ridges 17 and internally projecting guide ridges 18, by means of which the two sliding guide pieces 10 and 11 are moved relative to each other. Between these, it is possible to locate friction bearings 30 (see FIG. 3).

Within the space 16 between the two sliding guide pieces 10 and 11, a traversing drive 19 is provided in the form of an hydraulic piston cylinder unit 20, by means of which the two sliding guide pieces 10 and 11 can be moved axially relative to each other. On piston 21 is linked to the one end of lower beam 11, while the cylinder 22 of piston cylinder unit 20 is attached to upper beam 10. The piston can be supplied with hydraulic fluid from two sides through hydraulic connections 23 and 24 in order to generate the desired travel motion.

Figure 2:
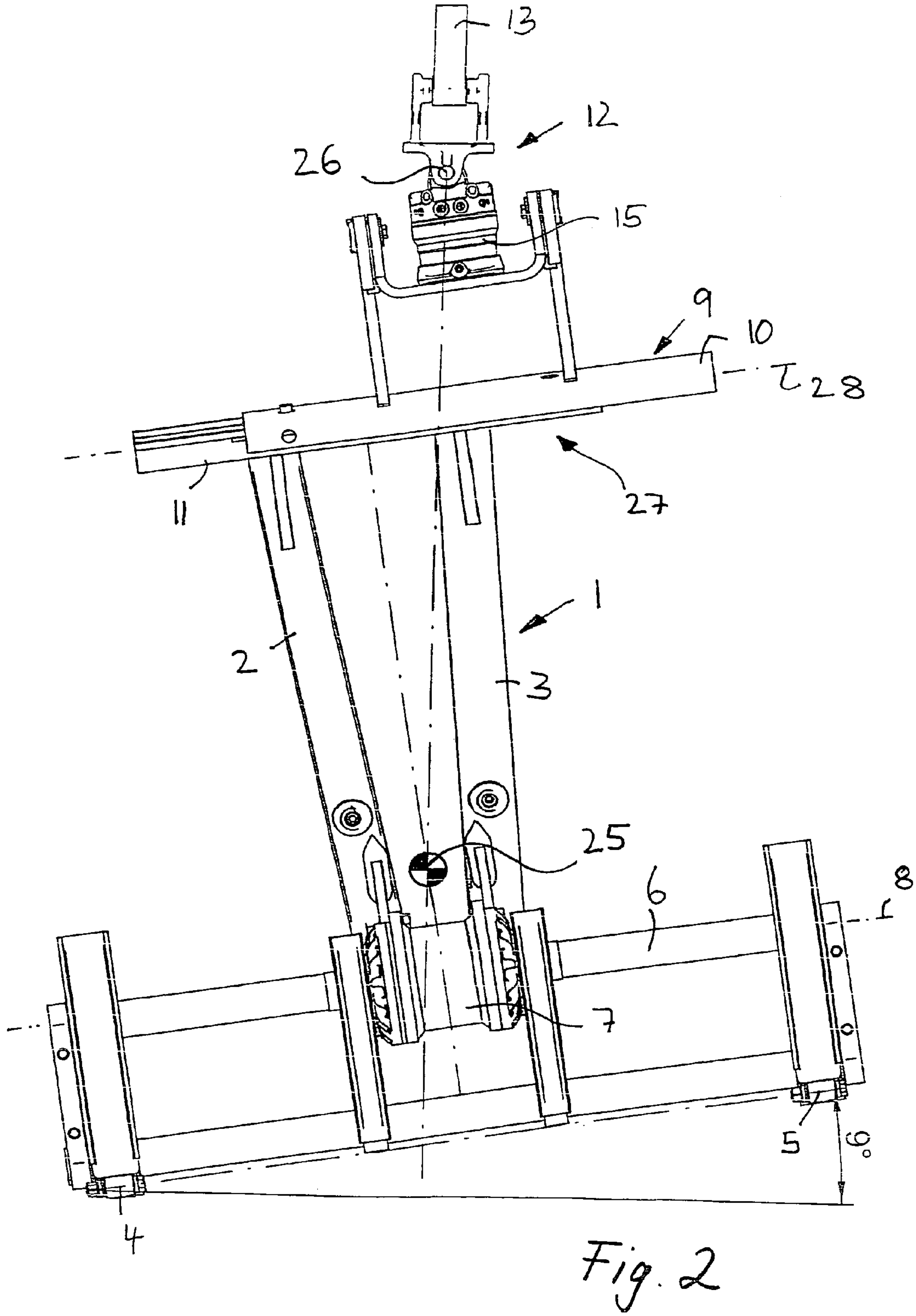
FIG. 2 is a front view of the turning fork of FIG. 1, wherein the fork carrier supporting the lifting prongs has been deflected transversely relative to its longitudinal axis so that the lifting prongs define a tilted support plane.

Whenever the lifting fork is intended, for example, to remove pallets stacked on a truck which is located on an incline, lifting fork carrier 6 along with its attached lifting prongs 4 and 5 can be correspondingly tilted by having traversing drive 19 of drive assembly 27 move fork carrier 1 along sliding guide 9 traversely relative to the longitudinal direction of fork carrier 1, specifically relative to linking piece 12, as shown in FIG. 2.

The center of gravity 25 of the lifting fork here remains vertical under pendulous axis 26 due to gravity. As a result, a tilted position is obtained for the lifting fork which in the embodiment illustrated assumes an angle $\alpha$ of 9°. By moving fork carrier 1 in an opposite manner, an opposite tilt position may be obtained.

The invention claimed is:

1. Lifting fork configured to lift pallets, panels or panel stacks, comprising a fork carrier (1) having a lower end which supports parallel lifting prongs (4, 5) which define a longitudinal direction, and an upper end which is connectable to a linking piece (12), the linking piece having a pendulous axis (26) to pendulously mount the lifting fork, the lifting prongs defining a surface extending directly from the lower end and being configured to engage the lift pallets, panels or panel stacks, a drive assembly (27) arranged to swivel the lifting prongs (4, 5) in an unloaded state about an axis parallel to and vertically spaced apart from the pendulous axis (26), and which is parallel to the longitudinal direction of the lifting prongs (4, 5), the drive assembly including a first beam connected to the fork carrier (1) and a second beam connected to the linking piece (12), wherein the first beam and the second beam each define a U-shaped cross-section having different widths respectively, the U-shaped cross-sections being disposed in opposing relation to telescopically couple the first beam and the second beam such that the first beam movably engages the second beam to move the fork carrier (1) relative to the linking piece (12) along a travel axis (28) disposed perpendicular to the pendulous axis (26).

2. Lifting fork according to claim 1, wherein the drive assembly comprises a traversing drive (19) disposed between the first beam and the second beam, the traversing drive being engageable with the first beam and the second beam in a configuration to move the fork carrier (1) relative to the linking piece (12) along the travel axis (28).

3. Lifting fork according to claim 2, wherein the traversing drive (19) is of an hydraulically operating design and has a piston cylinder unit (20) located parallel to the travel axis (28) and disposed for engagement with the first beam.

4. Lifting fork according to claim 3, further comprising a swivel drive (7) structured and arranged to swivel the lifting prongs (4, 5) relative to the fork carrier (1) about a swivel axis (8) parallel to the travel axis (28).

5. Lifting fork according to claim 2, further comprising a swivel drive (7) structured and arranged to swivel the lifting prongs (4, 5) relative to the fork carrier (1) about a swivel axis (8) parallel to the travel axis (28).

6. Lifting fork according to claim 1, wherein the first beam is a first sliding guide piece connected to the fork carrier (1) and the second beam is a second sliding guide piece connected to the linking piece (12), the first sliding guide piece and the second sliding guide piece being configured to form a sliding guide (9) whereby said first and second sliding guide pieces are arranged to slide with respect to one another.

7. Lifting fork according to claim 6, wherein the sliding guide (9) includes a traversing drive (19) disposed between the first beam and the second beam, the traversing drive being engageable with the first beam and the second beam in a configuration to move the fork carrier (1) relative to the linking piece (12) along the travel axis (28).

8. Lifting fork according to claim 7, wherein the traversing drive (19) is of an hydraulically operating design and has a piston cylinder unit (20) located parallel to the travel axis (28) and disposed for engagement with the first beam.

9. Lifting fork according to claim 8, further comprising a swivel drive (7) structured and arranged to swivel the lifting prongs (4, 5) relative to the fork carrier (1) about a swivel axis (8) parallel to the travel axis (28).

10. Lifting fork according to claim 6, further comprising a swivel drive (7) structured and arranged to swivel the lifting prongs (4, 5) relative to the fork carrier (1) about a swivel axis (8) parallel to the travel axis (28).

11. Lifting fork according to claim 1, further comprising a swivel drive (7) structured and arranged to swivel the lifting prongs (4, 5) relative to the fork carrier (1) about a swivel axis (8) parallel to the travel axis (28).

12. Lifting fork according to claim 11, wherein said swivel axis (8) is oriented transversely to a longitudinal direction of both said lifting prongs (4,5) and the fork carrier (1).

13. Lifting fork according to claim 1, wherein said fork carrier (1) is constituted by two beams (2,3) oriented in a V-shape and interconnecting said lifting prongs (4,5) and the drive assembly (27).

14. Lifting fork configured to lift pallets, panels or panel stacks, the lifting fork comprising a fork carrier (1) having a lower end supporting parallel lifting prongs (4, 5) which define a longitudinal direction, and an upper end connectable to a linking piece (12), the linking piece having a pendulous axis (26) to pendulously mount the lifting fork, a drive assembly (27) arranged to swivel the lifting prongs (4, 5) in an unloaded state about an axis parallel to and vertically spaced apart from the pendulous axis (26), and which is parallel to the longitudinal direction of the lifting prongs (4, 5), the drive assembly including a sliding guide (9) provided between the fork carrier (1) and the linking piece (12), the sliding guide having a travel axis (28) orientated perpendicular to the pendulous axis (26) and parallel to a support plane defined by the lifting prongs (4, 5), the sliding guide (9) having a first sliding guide piece connected to the fork carrier (1) and a second sliding guide piece connected to the linking piece (12), said first and second sliding guide pieces being arranged to slide with respect to one another and are constituted respectively by first and second telescoping beams, each of said first and second telescoping beams having an approximately U-shaped cross-section, wherein said first and second telescoping beams have different widths respectively, and are telescopically coupled together such that the U-shaped cross section of the first telescoping beam and the U-shaped cross section of the second telescoping beam are oppositely-oriented with respect to one another, the first and second telescoping beams including respectively externally and internally-projecting guide ridges (17, 18) to telescopically couple said first and second telescoping beams together; and a traversing drive (19) disposed between the first beam and the second beam, the traversing drive being engageable with the first beam and the second beam in a configuration to move the fork carrier (1) relative to the linking piece (12) along the travel axis (28).

15. Lifting fork according to claim 14, wherein the traversing drive (19) comprises an hydraulically-operated piston-cylinder unit (20) having a piston (21) coupled to one (11) of said beams (10, 11) and cylinder (22) coupled to the other of said beams (10, 11).

16. Lifting fork according to claim 15, wherein said traversing drive (19) is structured and arranged to slide said beams (10, 11) with respect to one another such that a center of gravity (25) of the lifting fork remains vertical under the pendulous axis (26) due to gravity and the lifting prongs (4,5) are tilted.

17. Lifting fork according to claim 16, wherein said fork carrier (1) additionally comprises two beams (2,3) oriented in a V-shape and coupled to one (11) of said telescopically- sliding beams (10, 11), a lifting prong carrier (6) supporting said lifting prongs (4,5) and mounted upon said V-shape oriented beams (2,3), and a swivel drive (7) structured and arranged to swivel the lifting prongs (4,5) relative to the fork carrier (1) about a swivel axis (8) parallel to the travel axis (28).

18. A lifting fork configured to lift pallets, panels or panel stacks, the lifting fork comprising:

a fork carrier (1) having a lower end which supports longitudinally extending lifting prongs (4,5), and an upper end connectable to a linking piece (12), the linking piece having a longitudinal pendulous axis (26) to pendulously mount the lifting fork, the lifting prongs defining a surface extending directly from the lower end and being configured to engage the lift pallets, panels or panel stacks, wherein the fork carrier includes a drive assembly (27) arranged to swivel the lifting prongs (4,5) in an unloaded state about a longitudinally extending swivel axis parallel to and vertically spaced apart from the pendulous axis (26), and which is parallel to the longitudinal direction of the lifting prongs (4, 5), the drive assembly including a first beam connected to the fork carrier (1) and a second beam connected to the linking piece (12), wherein the first beam and the second beam each define a U-shaped cross-section having different widths respectively, the U-shaped cross-sections being disposed in opposing relation to telescopically couple the first beam and the second beam such that the first beam slidably engages the second beam to move the fork carrier (1) relative to the linking piece (12) along a travel axis (28) disposed perpendicular to the pendulous axis (26); and a traversing drive (19) disposed between the first beam and the second beam, the traversing drive being engageable with the first beam and the second beam in a configuration to slidably move the fork carrier (1) relative to the linking piece (12) along the travel axis (28).

19. A lifting fork configured to lift pallets, panels or panel stacks, the lifting fork comprising:

a fork carrier (1) having a lower end supporting parallel lifting prongs (4, 5) that define a longitudinal direction, and an upper end being connectable to a linking piece (12) having a pendulous axis (26) to pendulously mount the lifting fork, the lifting prongs defining a surface extending directly from the lower end and being configured to engage the lift pallets, panels or panel stacks;

the upper end including a drive assembly (27) arranged to swivel all lifting prongs (4, 5) in an unloaded state about an axis parallel to and vertically spaced apart from the pendulous axis (26), and which is parallel to the longitudinal direction of the lifting prongs (4, 5);

the lower end including a swivel drive (7) configured to swivel the lifting prongs relative to the fork carrier (1) about a swivel axis (8), the swivel axis (8) being oriented perpendicular to the pendulous axis (26), wherein the drive assembly includes a first beam connected to the fork carrier (1) and a second beam connected to the linking piece (12), wherein the first beam and the second beam each define a U-shaped cross-section having different widths respectively, the U-shaped cross-sections being disposed in opposing relation to telescopically couple the first beam and the second beam such that the first beam movably engages the second beam to move the fork carrier (1) relative to the linking piece (12) along a travel axis (28) disposed perpendicular to the pendulous axis (26); and a traversing drive (19) disposed between the first beam and the second beam, the traversing drive being engageable with the first beam and the second beam in a configuration to move the fork carrier (1) relative to the linking piece (12) along the travel axis (28).

* * * * *